Patented Oct. 2, 1951

2,570,052

UNITED STATES PATENT OFFICE 2,570,052

MONOAZO DYESTUFFS

Friedrich Felix and Alphonse Heckendorn, Basel, and Willy Widmer, Bottmingen, Switzerland, assignors to Ciba Limited, Basel, Switzerland, a Swiss firm No Drawing. Application February 18, 1947, Serial No. 729,417. In Switzerland February 27, 1946

13 Claims. (Cl. 260—162)

According to this invention valuable new dyestuffs capable of being chromed are made by treating an ortho : ortho'-dihydroxy-monoazo-dyestuff, which contains a single sulfonic acid group, with an organic acylating agent.

The expression "ortho : ortho' - dihydroxy-monoazo-dyestuffs" is used herein to denote monoazo-dyestuffs containing the atomic grouping

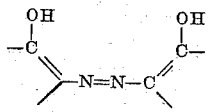

As starting materials for the invention there come into consideration more especially those ortho : ortho' -dihydroxy - monoazo - dyestuffs having a single sulfonic acid group which contain at least once the residue of a component of the benzene or naphthalene series. Such monoazo-dyestuffs can be obtained in known manner, for example, by coupling the diazo-compound of an aromatic ortho-amino-hydroxy-compound containing at the most two condensed rings, viz., the diazo-compound of an ortho-amino-hydroxybenzene or of an ortho-amino-hydroxynaphthalene with an azo-component capable of coupling in ortho-position with respect to an HO-group, and so selecting the two starting components that one of them contains a sulfonic acid group. The ortho-amino-hydroxy-benzenes or ortho-amino-hydroxynaphthalenes to be converted into diazo-compounds may contain further substituents, for example, the above mentioned sulfonic acid group, and also other substituents. As such substituents there may be mentioned, for example, halogen atoms such as bromine and especially chlorine, nitro groups, alkoxy groups, sulfonic acid alkylaryl-amide groups or alkyl groups. As examples of such ortho-amino-hydroxy-compounds to be converted into the diazo compound there may be mentioned the following:

Components containing a sulfonic acid group which are to be coupled with azo-components free from sulfonic acid groups, namely 2-amino-1-hydroxybenzene-4-sulfonic acid, 4-methyl-2-amino - 1 - hydroxy - benzene-5-sulfonic acid, 4-chloro - 2 - amino - 1-hydroxybenzene-6-sulfonic acid, 4-nitro-2-amino-hydroxybenzene-6-sulfonic acid, 6 - nitro-2-amino-1-hydroxybenzene-4-sulfonic acid, 5-nitro-2-amino-1-hydroxybenzene-4-sulfonic acid, 1-amino-2-hydroxy-naphthalene-4-sulfonic acid, 2-amino - 1 - hydroxy-naphthalene-4-sulfonic acid or 6 nitro-1-amino-2-hydroxy-naphthalene-4-sulfonic acid; components free from sulfonic acid groups which are to be coupled with azo-components containing a sulfonic acid group, namely 2-amino-1-hydroxy-benzene, 4-chloro-2-amino - 1 - hydroxybenzene, 4:6-dichloro-2-amino-1-hydroxybenzene, 3:4:6-trichloro-2-amino-1-hydroxybenzene, 6-nitro-4-methyl-2-amino - 1 - hydroxybenzene, 4-nitro-2-amino-1-hydroxybenzene, 5-nitro-2-amino-1-hydroxybenzene, 6-nitro - 2 - amino-1-hydroxybenzene, 5-nitro-4-chloro-2-amino - 1 - hydroxybenzene, 6-nitro-2-amino-4-chloro - 1 - hydroxybenzene, 4-nitro-6-chloro-2-amino - 1 - hydroxybenzene, 4:6-dinitro-2-amino-1-hydroxybenzene or 2-amino-1-hydroxybenzene-4-sulfonic acid diethylamide.

As azo-components which come into consideration for making the starting materials used in the present process there are suitable those which owe their coupling capacity to a phenolic hydroxyl group or to the presence of a reactive methylene group. As examples of such azo-components there may be mentioned:

Hydroxypyrene, hydroxybenzenes capable of coupling in ortho-position with respect to the hydroxyl group, such as 1-hydroxy-4-methyl-benzene, 1-hydroxy-4-tertiary amyl-benzene, 1-hydroxy-4-isobutyl-benzene; 8-hydroxy - quinolines capable of coupling in ortho-position with respect to the hydroxyl group, such as 5-chloro-8-hydroxy-quinoline; acetoacetic acid arylides such as acetoacetic acid anilide or acetoacetic acid ortho-anisidide; and also 2:4-dihydroxy-quinoline and the like. Especially good results can be obtained with hydroxynaphthalenes which couple in ortho-position with respect to a hydroxyl group or are capable of coupling in such a position, or with pyrazolones, especially 1-aryl (for example, phenyl)-3-methyl-5-pyrazolones. As examples of such azo-components there may be mentioned: 1 - hydroxy - naphthalene - (in which case it is necessary to work under conditions such that coupling occurs in the 2-position, for example, in a medium rendered strongly alkaline with caustic alkali), 5-chloro-1-hydroxy-naphthalene, 5:8-dichloro - 1 - hydroxynaphthalene, 1-hydroxy - 4 - methoxynaphthalene, 2-hydroxy-naphthalene, 2-hydroxy-6-methoxynaphthalene, 2-hydroxy-7-methoxynaphthalene, 2-hydroxy-naphthalene-6-sulfonic acid diethylamide, 1-hydroxy - naphthalene - 4 - sulfonic acid, 1-hydroxynaphthalene - 5 - sulfonic acid, 2-hydroxy-naphthalene-4-sulfonic acid, 2-hydroxynaphthalene - 6 - sulfonic acid, 2-hydroxynaphthalene-7-sulfonic acid, 1-hydroxynaphthalene-3-sulfonic acid-N-methylanilide-8-sulfonic acid; 3-methyl- 5-pyrazolone, 1:3-diphenyl-5-pyrazolone, 1-phenyl-3-methyl-5-pyrazolone, 1-(3'-nitro)-phenyl-3-methyl-5-pyrazolone, 1 - (2' - chloro) - phenyl-3-methyl - 5 - pyrazolone, 1 - (3' - sulfo)-phenyl-3-methyl-5-pyrazolone, 1 - (2' - chloro - 5' - sulfo)-phenyl-3-methyl-5-pyrazolone, 1-(2'-methyl-5'-sulfo)-phenyl-3-methyl-5-pyrazolone.

As acylating agents for use in treating the ortho : ortho'-dihydroxy-monoazo-dyestuffs containing a sulfonic acid group in accordance with the invention there may be mentioned acylating agents which contain as the sole acylating group a functionally converted carboxyl group, for example, carboxylic acid halides such as the acid bromides or chlorides, or carboxylic anhydrides. Among these compounds especially good results can be obtained with those which are free from groups imparting solubility and substituents convertible into such groups, for example, cinnamic acid chloride, arylhydroxy-acetic acid halides, acetic anhydride, butyric acid chloride, and the like, and above all derivatives of benzoic acid such as meta- or para-nitrobenzoyl chloride and principally benzoic acid halides such as benzoyl bromide and especially benzoyl chloride.

The treatment with the acylating agent may with advantage be carried out in the presence of a tertiary organic base, for example pyridine. It is also generally desirable to work in an anhydrous medium and in the absence of free alkalies. In the case of dyestuffs which have been obtained by coupling a diazotized ortho-amino-hydroxybenzene or ortho-amino-hydroxynaphthalene with a compound coupling in ortho-position with respect to a phenolic hydroxyl group, for example, with a hydroxynaphthalene, the acylation may be carried out differently. However, it must be carried out in such a manner that at least one hydroxyl group in ortho-position with respect to the azo-group is acylated. The second hydroxyl group in ortho-position with respect to the azo-group may then remain unchanged depending on the kind and quantity of the acylating agent and on the conditions of the reaction, or it may be acylated in part of the dyestuff subjected to the acylation, or be acylated entirely. In the case of dyestuffs which are obtained by using 1-phenyl-3-methyl-5-pyrazolones as coupling components the enolized keto group in the 5-position of the pyrazolone residue is not easily esterified by the present process.

The monoazo-dyestuffs obtainable by the present process are new and correspond to the formula

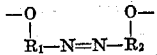

in which the groups —O— are in positions adjacent to the —N=N— group, $R_1$ represents an aromatic radical containing at the most two condensed rings, $R_2$ represents a residue of a coupling component, at least one aromatic bound —O— group is attached by its free valency to the —CO— group of a carboxylic acid which is free from substituents imparting solubility, and in which the residue

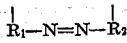

contains a single sulfonic acid group.

The mono-azo-dyestuffs obtainable by the invention are principally suitable for dyeing by the chroming process in which the dyeing is carried out by the single bath process with baths which contain the dyestuff and also an agent yielding chromium. A dyeing process of this kind is, for example, that in which dyeing baths are used which contain, in addition to the dyestuff, an alkali chromate such, for example, as sodium chromate or potassium chromate, and a buffer salt which prevents the bath becoming alkaline at a raised temperature, for example, at 100° C. A salt of this kind, is, for example, ammonium sulfate. The method of dyeing by the single bath chroming process with baths which contain the dyestuff, an alkali chromate and ammonium sulfate is known under the name synchromate process or metachrome process. A special object of the invention is to enable chromable dyestuffs which are not suitable for dyeing by the aforesaid single bath chroming process into dyestuffs which are especially suitable for this dyeing process. In the dyeing process the complex chromium compound of the dyestuff is formed with the elimination of the acyl residue. The dyeings so obtained may be distinguished by very good properties of fastness, especially by very good properties of wet fastness. As fibers which may be dyed by the single bath chroming process, especially the so-called synchromate process, with the monoazo-dyestuffs obtainable by the invention, there may be mentioned principally fibers of animal origin such as silk, leather and principally wool. Mixed fabrics, for example of wool and regenerated cellulose and also animalized cellulose, artificial fibers of casein, artificial fibers of superpolyamides or superpolyurethanes, can be dyed in this manner.

As compared with the process of French Patent No. 914,640, in which is described the manufacture of ester-like derivatives of ortho : ortho'-dihydroxyazo-dyestuffs which are sparingly soluble to insoluble in water which are derived from dyestuffs free from sulfonic acid groups and which contain in addition to the group which brings about acylation, an atomic grouping which determines the solubility of the acylation product, the process of the present invention for producing chromable dyestuffs is distinguished by the use of ortho : ortho'-dihydroxyazo-dyestuffs containing a sulfonic acid group as starting materials, and by the use advantageously as acylating agents of compounds which are free from groups imparting solubility and substituents convertible into such groups.

The following examples illustrate the invention, the parts being by weight:

*Example 1*

12.6 parts of benzoyl chloride are introduced drop-wise at room temperature into 280 parts of dry pyridine, while thoroughly stirring, and then there are introduced 40 parts of the pulverized and thoroughly dried dyestuff obtained by coupling diazotized 1-amino-2-hydroxy-naphthalene-4-sulfonic acid with 1-hydroxy-naphthalene and, after coupling, freeing the product from any free alkali by acidification. The temperature of the esterification mixture is maintained for 2 hours at 40–45° C., and the greater part of the pyridine is then distilled under reduced pressure. The residue is stirred into about 400 parts of water, the dyestuff ester of the formula

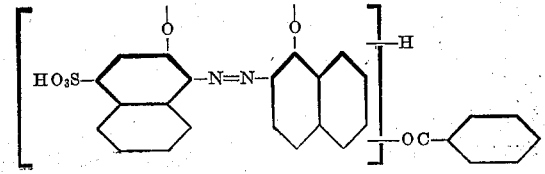

is separated by filtering with suction after the addition of 20–40 parts of sodium chloride, and dried under reduced pressure. 45 parts of a dark, water-soluble powder are obtained which dyes wool blue tints by the single bath process in the presence of an agent yielding chromium. A similar product which corresponds of the formula

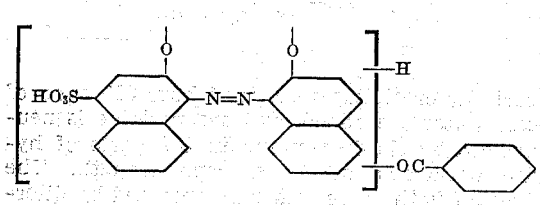

is obtained when, instead of 1-hydroxy-naphthalene, 2-hydroxy-naphthalene is coupled with the diazo-compound of 1-amino-2-hydroxynaphthalene-4-sulfonic acid to form the dyestuff to be esterified.

*Example 2*

11.2 parts of benzoyl chloride are introduced drop-wise while thoroughly stirring in 280 parts of dry pyridine, and then there are introduced 44 parts of the finely pulverized and thoroughly dried dyestuff obtained by coupling diazotized 1-amino-6-nitro-2-hydroxy-naphthalene-4-sulfonic acid with 2-hydroxy-naphthalene. The temperature of the esterification mixture is maintained for 2 hours at 40–45° C., and then the greater part of the pyridine is distilled under reduced pressure. The residue is stirred in about 400 parts of water, the dyestuff ester of the formula

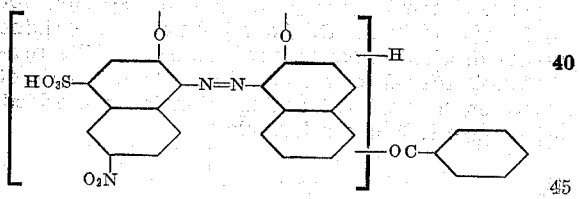

is separated by filtering with suction after the addition of 20–40 parts of sodium chloride and dried under reduced pressure. 50 parts of a dark red, water-soluble powder are obtained, which dyes wool black tints by the single bath process in the presence of an agent yielding chromium.

*Example 3*

44 parts of the dry dyestuff, which has been obtained by coupling diazotized 5-nitro-4-chloro-2-aminophenol with 1-hydroxy-naphthalene-5-sulfonic acid, are esterified at 60–70° C. with 11 parts of benzoyl chloride in 200 parts of dry pyridine. After 1 hour the whole is diluted with 300 parts of water, and the pyridine is neutralized with 285 parts of hydrochloric acid of 30 per cent. strength. The dyestuff ester of the formula

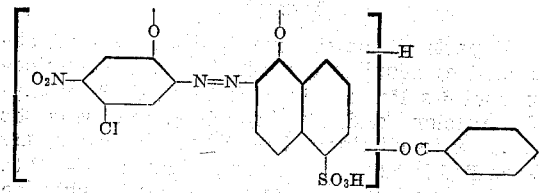

is then removed by filtering with suction, washed and dried. There are obtained 52 parts of a dark powder which dissolves in hot water with a bordeaux red coloration and dyes wool blue tints by the single bath process in the presence of an agent yielding chromium.

By using instead of the above-mentioned dyestuff the dyestuff obtained by coupling diazotized 4-nitro-2-aminophenol with 1-hydroxy-naphthalene-5-sulfonic acid there is obtained the dyestuff ester of the formula

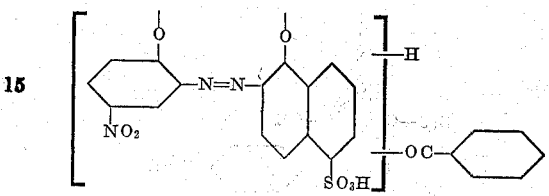

which is similarly soluble in hot water, and which dyes wool violet brown tints by the single bath process in the presence of an agent yielding chromium.

*Example 4*

42.2 parts of the dried dyestuff, which is obtained by coupling diazotized 1-amino-2-hydroxy-naphthalene-4-sulfonic acid with 1-phenyl-3-methyl-5-pyrazolone and has finally been freed from alkali by washing and acidifying, are introduced into 280 parts of dry pyridine at 65–70° C., and esterified by introducing 11.5 parts of benzoyl chloride dropwise. With a slight rise in temperature there is rapidly obtained a clear dark red solution. The whole is stirred for 1 hour, during which the temperature is not allowed to fall below 40–45° C., about 200 parts of pyridine are then distilled under reduced pressure, and the residue is taken up in 200 parts of water. By the addition of 20 parts of sodium chloride the dyestuff of the formula

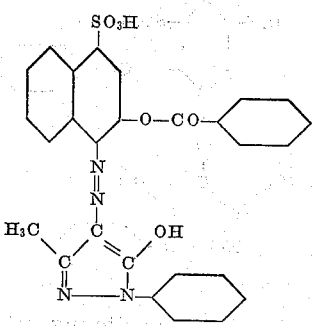

is completely precipitated, and then separated by filtering with suction and dried at 60° C. under reduced pressure.

There are obtained 50 parts of an orange powder which dissolves in warm water to give a clear solution. It dyes wool pure bluish red tints by the single bath process in the presence of an agent yielding chromium.

*Example 5*

16.8 parts of benzoyl chloride are introduced dropwise while thoroughly stirring into 280 parts of dry pyridine at room temperature, and then there are introduced 45.6 parts of the pulverized and dried dyestuff obtained by coupling diazotized 1-hydroxy-2-amino-4-nitro-6-chlorobenzene with 1-(4'-sulfophenyl)-3-methyl-5- pyrazolone. The esterification is continued for 2 hours at 40–45° C., the greater part of the pyridine is then distilled under reduced pressure, the residue is introduced into 400 parts of water, the dyestuff ester of the formula

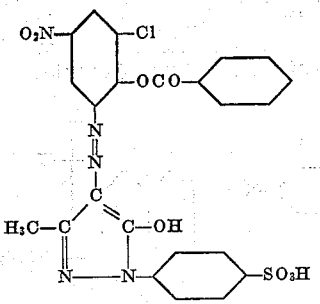

is separated by filtering with suction, if desired, after the addition of 20–40 parts of sodium chloride, and dried under reduced pressure. About 55 parts of a red-brown water-soluble powder are obtained which dyes wool orange tints by the single bath process in the presence of an agent yielding chromium.

*Example 6*

42 parts of the dried dyestuff which has been obtained by coupling diazotized 4-nitro-2-aminophenol-6-sulfonic acid with 1-phenyl-3-methyl-5-pyrazolone, are dissolved at 60–70° C. in 280 parts of dry pyridine, and esterified by introducing dropwise 12.5 parts of benzoyl chloride while stirring. After 1 hour the suspension is stirred in 300–400 parts of ice and the whole is rendered weakly acid to Congo by introducing dropwise about 350 parts of hydrochloric acid of 30 per cent. strength. The dyestuff of the formula

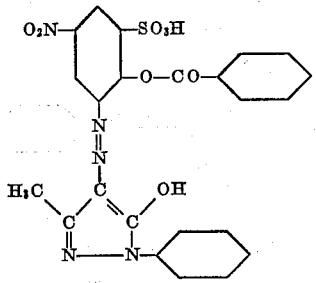

is then separated by filtering with suction, washed with a solution of sodium chloride of 10 per cent. strength until neutral, and dried.

The dyestuff derivative is an orange powder which dissolves to give a clear solution in warm water, and dyes wool reddish orange tints by the single bath process in the presence of an agent yielding chromium.

*Example 7*

40 parts of the pulverized and thoroughly dried dyestuff obtained by coupling diazotized 1-hydroxy-2-amino-4-chlorobenzene-6-sulfonic acid with 2:4-dihydroxyquinoline and washing and acidifying the product after coupling to eliminate free alkali therefrom, are slowly esterified in 200 parts of dry pyridine while thoroughly stirring at 65–75° C. with 14 parts of benzoyl chloride. In this manner a solution is obtained from which the orange colored dyestuff ester of the formula

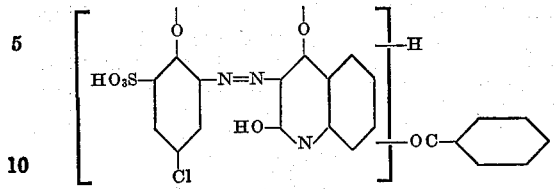

partially precipitates. After 1 hour 300 parts of cold water are added, and the pyridine is neutralized by slowly running in 280 parts of hydrochloric acid of 30 per cent strength. The dyestuff is thus precipitated, separated by filtering with suction, washed with cold water, and dried at 90° C. under reduced pressure.

There are obtained about 46 parts of a yellow-orange powder, which dissolves in hot water to give a clear solution. It dyes wool fast bordeaux-red tints by the single bath process in the presence of an agent yielding chromium.

*Example 8*

46 parts of the pulverized and thoroughly dried dyestuff, obtained by coupling diazotized 1-amino-2-hydroxy-naphthalene-4-sulfonic acid with 1-(2'-chlyorophenyl)-3-methyl-5-pyrazolone and washing and acidifying the product after coupling, to eliminate free alkali therefrom, are dissolved in 280 parts of dry pyridine to give a clear solution, and slowly esterified at 40–45° C. with 11.2 parts of benzoyl chloride while stirring. The initially clear solution becomes turbid in a short time, and the dyestuff ester partially precipitates. After stirring for 1 hour at 40–45° C. about 220 parts of pyridine are distilled under reduced pressure. The residue is stirred for a short time with 400 parts of water, 20 parts of sodium chloride are added, the dyestuff of the formula

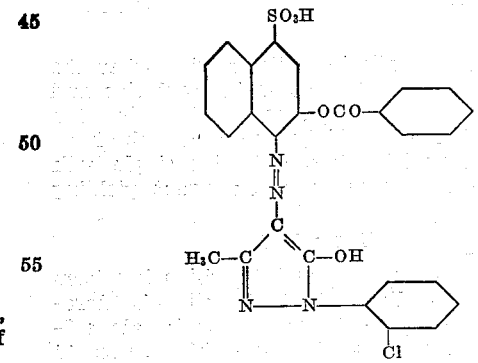

is separated by filtering with suction, and dried.

55 parts of an orange-red water-soluble powder are obtained, which dyes wool red tints by the single bath process in the presence of an agent yielding chromium.

*Example 9*

41 parts of the thoroughly dried dyestuff, obtained by coupling diazotized 4-chloro-2-aminophenol-6-sulfonic acid with 1-phenyl-3-methly-5-pyrazolone and, after coupling, acidifying the product to eliminate free alkali therefrom, are esterified in 280 parts of dry pyridine at 60–70° C. by introducing 11.2 parts of benzoyl chloride dropwise. After 1 hour the solution, in which the dyestuff ester is partially in suspension, is stirred in 300 parts of ice-water, and the whole is rendered weakly acid to Congo by adding dropwise about 350 parts of hydrochloric acid of 30 per cent. strength. The dyestuff ester of the formula

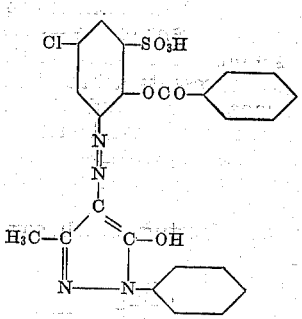

is then then separated by filtering with suction, washed neutral with cold water, and dried.

The dyestuff ester dissolves in boiling water to give a clear solution and dyes wool red tints by the single bath process in the presence of an agent yielding chromium.

*Example 10*

42.4 parts of the dry dyestuff, obtained by coupling diazotized 1-amino-2-hydroxynaphthalene-4-sulfonic acid with 1-phenyl-3-methyl-5-pyrazolone and finally washing and acidifying the product to eliminate free alkali therefrom, are introduced at 65–75° C. into 280 parts of dry pyridine, and esterified by introducing 12 parts of butyryl chloride dropwise. There is obtained a clear dark red solution, and after 1 hour about 200 parts of pyridine are distilled under reduced pressure. The residue is taken up in 300 parts of water, the dyestuff ester of the formula

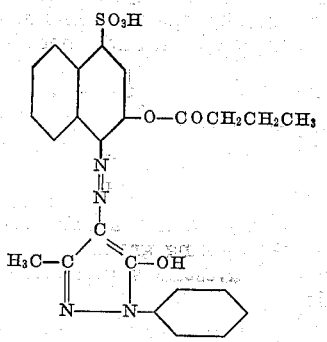

is completely precipitated with 30 parts of sodium chloride, and it is then separated by filtering with suction, and dried. There are obtained 50 parts of an orange powder, which dissolves in hot water to give a clear solution. It dyes wool pure bluish-red tints by the single bath process in the presence of an agent yielding chromium.

*Example 11*

47 parts of the dry dyestuff, obtained by coupling diazotized 1-amino-2-hydroxy-6-nitronaphthalene-4-sulfonic acid with 1-phenyl-3-methyl-5-pyrazolone and finally washing and acidifying the product to free it from excess alkali, are esterified in 280 parts of dry pyridine at 65–75° C. with 12 parts of benzoyl chloride. After 1 hour the whole is diluted with about 300 parts of cold water, the pyridine is neutralized with hydrochloric acid, and the precipitated dyestuff ester of the formula

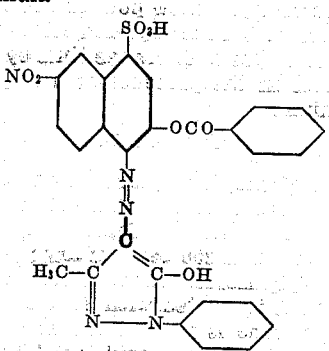

is separated by filtering with suction, washed and dried. There are obtained 60 parts of an orange powder which dissolves in boiling water to give a clear solution. It dyes wool strong yellowish red tints by the single bath process in the presence of an agent yielding chromium.

*Example 12*

44 parts of the dry dyestuff, obtained by coupling diazotized 1-hydroxy-2-aminobenzene-4-sulfonic acid-6-carboxylic acid with 1-phenyl-3-methyl-5-pyrazolone, are esterified in 200 parts of dry pyridine with 11 parts of benzoyl chloride at 60–70° C. After 1 hour the whole is diluted with 300 parts of water, and the pyridine is neutralized with 285 parts of hydrochloric acid of 30 per cent. strength. The dyestuff ester is then separated by filtering with suction, washed and dried. The dyestuff ester of the formula

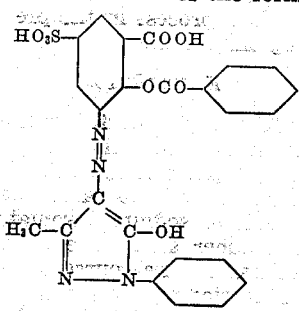

is obtained in a yield amounting to 53 parts. It dissolves in hot water and dyes wool orange tints by the single bath process in the presence of an agent yielding chromium.

*Example 13*

42 parts of the dry dyestuff, obtained by coupling diazotized 4-nitro-2-amino-1-hydroxybenzene-6-sulfonic acid with 1-phenyl-3-methyl-5-pyrazolone, are esterified in 200 parts of dry pyridine with 9.5 parts of para-nitrobenzoyl chloride. After 1 hour the reaction mass is taken up in 300 parts of water, neutralized with 285 parts of hydrochloric acid of 30 per cent. strength, the dyestuff ester of the formula

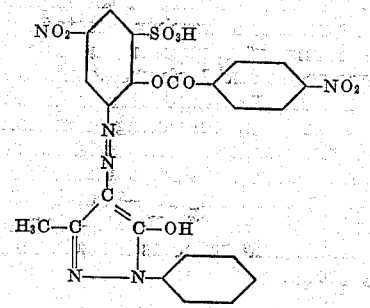

is separated by filtering with suction, washed with water, and dried. There are obtained 50 parts of an orange-yellow powder which dissolves in hot water with an orange-red coloration. The dyestuff ester dyes wool orange tints by the single bath process in the presence of an agent yielding chromium.

*Example 14*

40 parts of the dry dyestuff obtained by coupling diazotized 4-chloro-2-aminophenol with 2-hydroxynaphthalene-6-sulfonic acid, are esterified at 60-70° C. in 200 parts of dry pyridine with 23 parts of benzoylchloride. After 1 hour the reaction mass is diluted with 300 parts of water and the pyridine is neutralized with about 285 parts of hydrochloric acid of 30 per cent. strength; the dyestuff ester of the formula

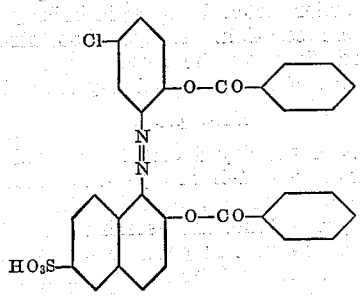

is separated by filtering, washed and dried. There are obtained 52 parts of an orange powder which dissolves in hot water with a red-orange coloration. The dyestuff dyes wool violet tints by the single bath process in the presence of an agent yielding chromium.

*Example 15*

100 parts of thoroughly wetted wool are entered at 60° C. into a dyebath which contains in 4000 parts of water 1.5 parts of dyestuff obtainable as described in Example 4, 2.5 parts of ammonium sulfate, 2.5 parts of sodium chromate and also 20 parts of Glauber salt. The temperature is raised to the boil in the course of 30 minutes, and dyeing is carried on for 2 hours at the boil. The goods are then rinsed and dried. The wool is dyed a pure bluish-red tint.

What we claim is:

1. A monoazo dyestuff which corresponds to the formula

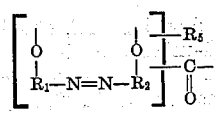

wherein the —O— atoms attached to $R_1$ and $R_2$ are in positions adjacent to the —N=N— group, $R_1$ represents a member selected from the group consisting of mononuclear radicals of the benzene series and binuclear radicals of the naphthalene series, $R_2$ represents a member selected from the group consisting of binuclear radicals of the naphthalene series and 1-phenyl-3-methyl-5-pyrazolone radicals, $R_3$ stands for a member selected from the group consisting of mononuclear radicals of the benzene series and lower alkyl radicals, and —$R_5$ stands for a member selected from the group consisting of —H and —CO—$R_3$, and wherein the —$R_1$—N=N—$R_2$— group bears a single sulfonic acid group as the sole solubility-imparting group.

2. A monoazo dyestuff which corresponds to the formula

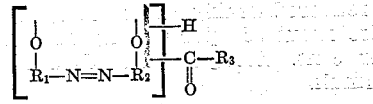

wherein the —O— atoms attached to $R_1$ and $R_2$ are in positions adjacent to the —N=N— group, $R_1$ represents a binuclear radical of the naphthalene series, $R_2$ represents a binuclear radical of the naphthalene series, and $R_3$ represents a mononuclear radical of the benzene series, and wherein the —$R_1$—N=N—$R_2$— group bears a single sulfonic acid group as the sole solubility-imparting group.

3. A monoazo dyestuff which corresponds to the formula

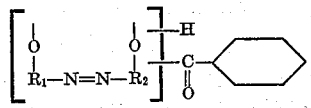

wherein the —O— atoms attached to $R_1$ and $R_2$ are in positions adjacent to the —N=N— group, $R_1$ represents a binuclear radical of the naphthalene series, and $R_2$ represents a binuclear radical of the naphthalene series, and wherein the —$R_1$—N=N—$R_2$— group bears a single sulfonic acid group as the sole solubility-imparting group.

4. A monoazo dyestuff which corresponds to the formula

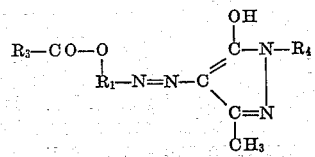

in which the $R_3$—CO—O— group is in a position adjacent to the —N=N— group, $R_1$ represents a binuclear radical of the naphthalene series, and each of $R_3$ and $R_4$ represents a mononuclear radical of the benzene series, and wherein the

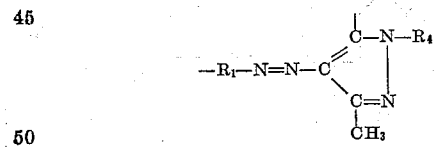

group bears a single sulfonic acid group as the sole solubility-imparting group.

5. A monoazo dyestuff which corresponds to the formula

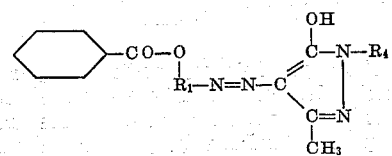

in which the

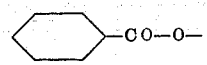

group is in a position adjacent to the —N=N— group, and each of $R_1$ and $R_4$ represents a mononuclear radical of the benzene series, and wherein the

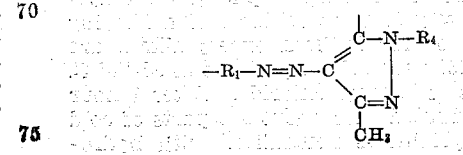

group bears a single sulfonic acid group as the sole solubility-imparting group.

6. A monoazo dyestuff which corresponds to the formula

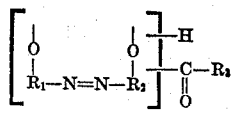

wherein the —O— atoms attached to $R_1$ and $R_2$ are in positions adjacent to the —N=N— group, each of $R_1$ and $R_3$ represents a mononuclear radical of the benzene series, and $R_2$ represents a binuclear radical of the naphthalene series, and wherein the —$R_1$—N=N—$R_2$— group bears a single sulfonic acid group as the sole solubility-imparting group.

7. A monoazo dyestuff which corresponds to the formula

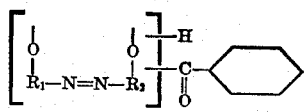

wherein the —O— atoms attached to $R_1$ and $R_2$ are in positions adjacent to the —N=N— group, $R_1$ represents a mononuclear radical of the benzene series, and $R_2$ represents a binuclear radical of the naphthalene series, and wherein the —$R_1$—N=N—$R_2$— group bears a single sulfonic acid group as the sole solubility-imparting group.

8. A monoazo dyestuff which corresponds to the formula

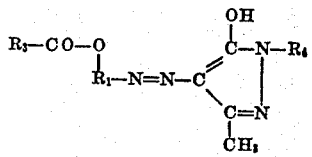

in which the $R_3$—CO—O— group is in a position adjacent to the —N=N— group, each of $R_1$, $R_3$ and $R_4$ represents a mononuclear radical of the benzene series, and the

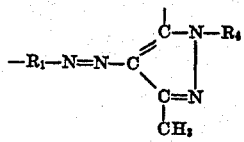

group bears a single sulfonic acid group as the sole solubility-imparting group.

9. A monoazo dyestuff which corresponds to the formula

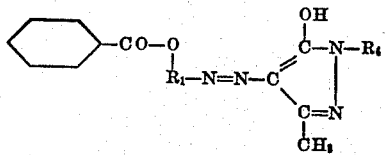

in which the

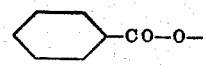

group is in a position adjacent to the —N=N— group, $R_1$ represents a binuclear radical of the naphthalene series, and $R_4$ represents a mononuclear radical of the benzene series, and wherein the

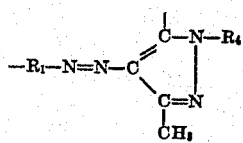

group bears a single sulfonic acid group as the sole solubility-imparting group.

10. A monoazo dyestuff of the formula

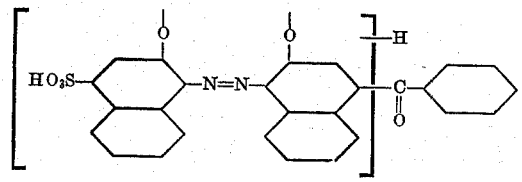

11. The monoazo dyestuff of the formula

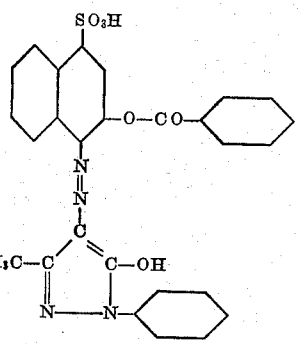

12. The monoazo dyestuff of the formula

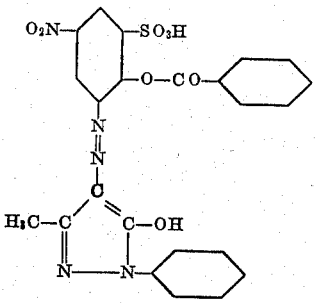

13. The monoazo dyestuff of the formula

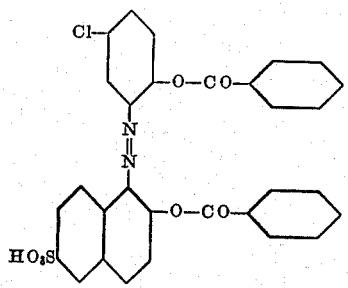

FRIEDRICH FELIX.
ALPHONSE HECKENDORN.
WILLY WIDMER.

REFERENCES CITED

The following references are of record in the file of this patent:

UNITED STATES PATENTS

| Number | Name | Date |
|---|---|---|
| 1,728,998 | Krzikalla | Sept. 24, 1929 |
| 1,824,914 | Mirocourt | Sept. 29, 1931 |
| 1,844,397 | Kammerer et al. | Feb. 9, 1932 |
| 2,095,600 | Graenacher et al. | Oct. 12, 1937 |
| 2,120,741 | Graenacher et al. | June 14, 1938 |
| 2,170,262 | Graenacher et al. | Aug. 22, 1939 |
| 2,199,048 | Graenacher et al. | Apr. 30, 1940 |
| 2,237,483 | Graenacher et al. | Apr. 8, 1941 |
| 2,249,956 | Heyna | July 22, 1941 |
| 2,274,544 | Gubelmann | Feb. 24, 1942 |
| 2,276,187 | Graenacher et al. | Mar. 10, 1942 |

FOREIGN PATENTS

| Number | Country | Date |
|---|---|---|
| 510,091 | Great Britain | July 26, 1939 |